United States Patent [19]

Konzal

[11] Patent Number: 5,752,907
[45] Date of Patent: May 19, 1998

[54] CUP MAKING MACHINE

[75] Inventor: Daryl R. Konzal, Colgate, Wis.

[73] Assignee: Paper Machinery Corporation, Milwaukee, Wis.

[21] Appl. No.: 515,321

[22] Filed: Aug. 15, 1995

[51] Int. Cl.⁶ .................. B31C 1/06; B31B 1/32
[52] U.S. Cl. .................. 493/154; 493/106; 493/134
[58] Field of Search .................. 493/104, 105, 493/106, 107, 108, 129, 133, 134, 154, 155

[56] References Cited

U.S. PATENT DOCUMENTS 3,289,552  12/1966  Corazzo .................. 493/107
3,468,226  9/1969  England et al. .................. 493/133 X
4,490,130  12/1984  Konzal et al. .................. 493/106

*Primary Examiner*—Joseph J. Hail, III
*Assistant Examiner*—Anthony Ojini
*Attorney, Agent, or Firm*—Foley & Lardner

[57] ABSTRACT

A machine for making paper cups wherein each cup includes a side wall blank and a bottom wall blank, the machine including a frame and a vertical shaft mounted on the frame with a turret rotatably mounted on the shaft, a number of work stations mounted on the frame in an equally spaced relation around the turret with a number of tapered mandrels mounted on the turret in alignment with each of the work stations for forming the cup, the turret being intermittently rotated to move the mandrels sequentially into alignment with each of the work stations and a tubular assembly mounted for axial movement in each of the mandrels for initially releasing the cup from the mandrel.

10 Claims, 6 Drawing Sheets

CUP MAKING MACHINE

FIELD OF THE INVENTION

The present invention relates to a machine for the manufacture of thermoplastic coated paper cups and more particularly to a cup making machine having an improved system for sealing the overlapping edges of the side wall as well as a system for releasing the cup from the mandrel.

BACKGROUND OF THE INVENTION

Two piece thermoplastic coated paper cups of the type contemplated herein are produced by previous machines such as shown and described in U.S. Pat. No. 5,324,249, issued Jan. 28, 1994, to Daryl R. Konzal, entitled "Cup Making Machine." In this patent a machine is described for making two piece flat bottom paper cups with thermoplastic coated paper, each cup including a side wall blank and a disklike bottom wall blank. The bottom wall blank for the cup is retained on the end of the mandrel by drawing a vacuum through the end of a mandrel. The edges of the side wall blank are heated and aligned with the mandrel. A pair of folding wings are provided beneath each of the mandrels which are closed on the mandrel to wrap the side wall blank around the mandrel. The overlapped edges of the side wall blank are sealed by a seam clamp which is actuated by a linkage assembly. Timing of the mechanical actuation of the seam clamp has to be exact in order to both seal the edges of the cup and release the clamp from the mandrel. The cups are released from the mandrels by air pressure provided through the end of the mandrel. However, the cups often stick to the mandrel making it difficult to release the cup from the mandrel.

SUMMARY OF THE PRESENT INVENTION

In accordance with the present invention a cup making machine is described which has been modified to provide a mechanical release of the cup from the mandrel prior to blowing the cup off the mandrel. With this arrangement a positive release of the cup from the mandrel is assured.

Another aspect of the invention is the simultaneous lifting of the seam clamps from the mandrels by air pressure prior to advancing the mandrels to the next station. The air pressure is released when the mandrels are stopped allowing the seam clamps to drop onto the overlapped ends of the cup side walls thus assuring that edges are sealed.

Other principal features and advantages of the invention will become apparent to those skilled in the art upon review of the following drawings, the detailed description and the appended claims.

BRIEF DESCRIPTION OF THE DRAWINGS

FIG. 7 is a bottom view of the manifold plate taken on line 7—7 of FIG. 4.

Figure 1:
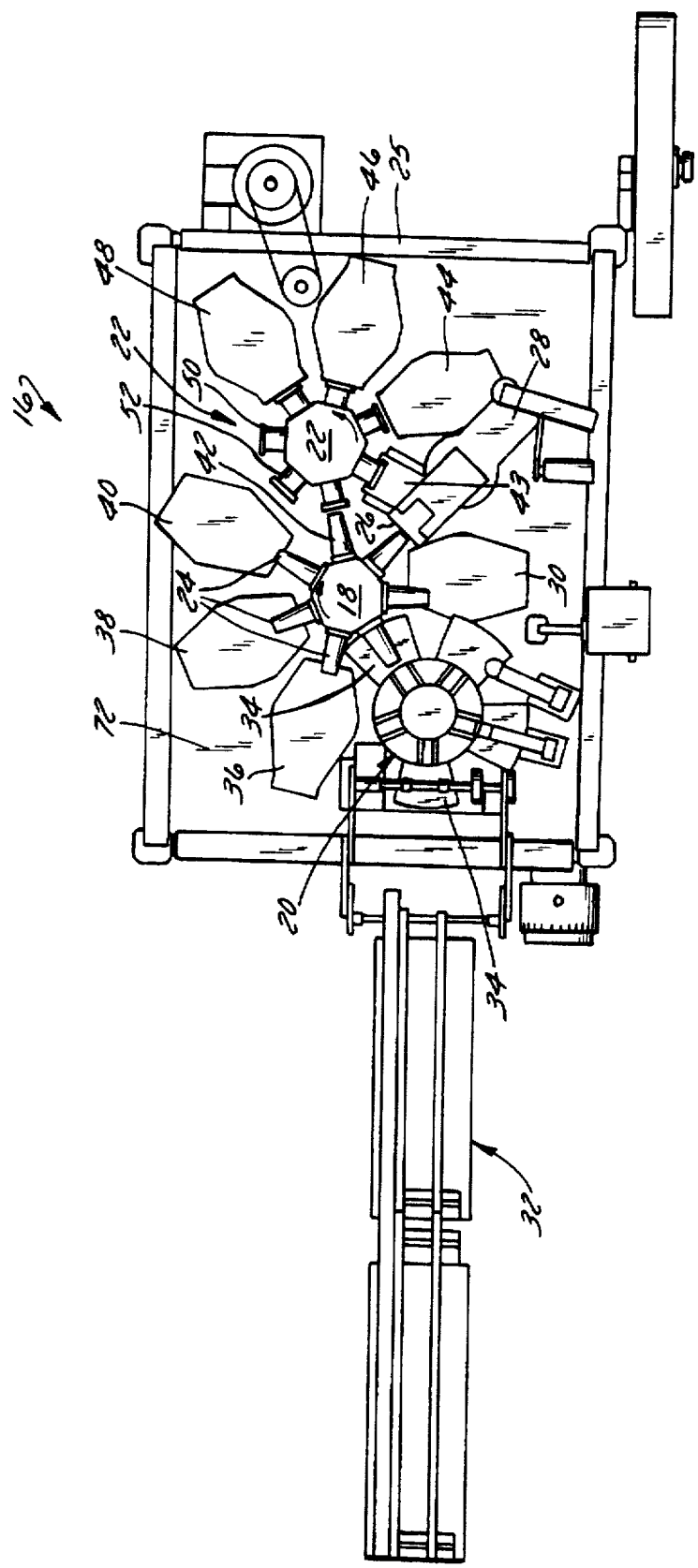
FIG. 1 is a schematic view of a cup making machine according to the invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The present invention relates to the operation of a cup making machine and more particularly to an air actuated seam clamp assembly 12 and mechanical cup ejection assembly 14. Referring to FIG. 1 an exemplary cup making machine 16 is shown which generally includes a mandrel turret 18, a transfer turret 20 and a rimming turret 22 mounted on a frame 25. The mandrel turret 18 is rotated in a step by step or indexing manner into alignment with each of the surrounding work stations 28, 30, 34, 36, 38, 40 and 42. In this regard a bottom blank 26 is applied to the end of a mandrel 24 at the bottom blank work station 28. The mandrel 24 is stepped to a bottom reformer station 30 wherein the edges of the bottom blank are folded outwardly. The mandrel 24 is then stepped into alignment with the transfer turret 20 wherein a side wall blank 34 is transferred from a hopper 32 to a position beneath the mandrel 24. The side wall blank 34 is folded about the mandrel 24, the edges of the bottom blank are heated, overlapped and sealed along the seam by the seam clamp assembly 12. The mandrel is then stepped in sequence to a bottom heat station 36, a roller in-curl station 38 and a bottom finish station 40.

Once the bottom blank is formed and sealed the cup is transferred to a discharge station 42 where it is transferred to a rimming turret 44, rotated to a lube station 46 and then rotated to a rimming precurl station 48 where the upper lip of the side wall is curled outwardly. From that station the cup is indexed to a rimming finish curl station 50 which finishes the curl portion along the top of the cup to make an attractive edge. The cup is then moved to a cup blow off station 52 for removal of the finished cup.

Figure 2:
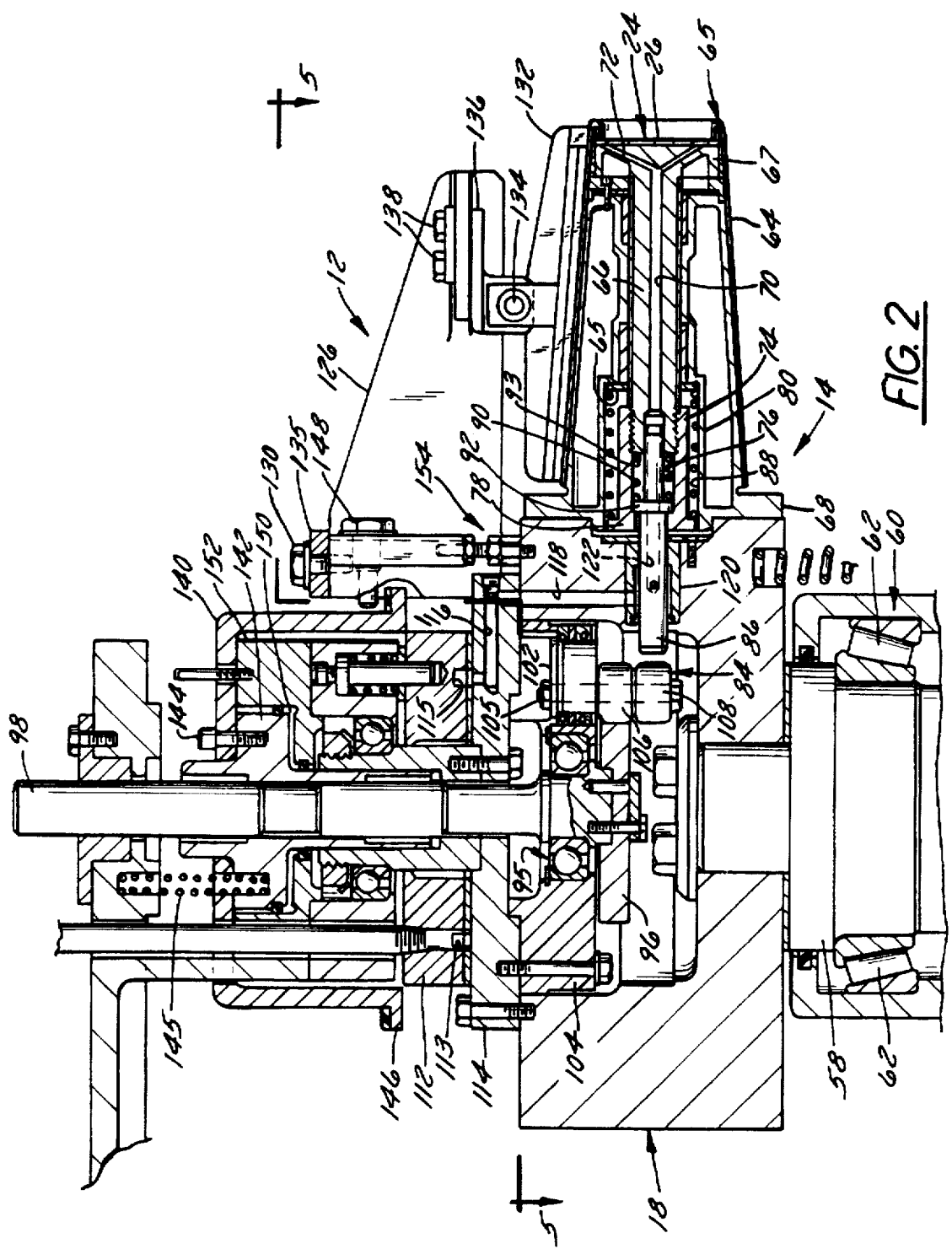
FIG. 2 is a side view in a section of the mandrel turret.
Figure 3:
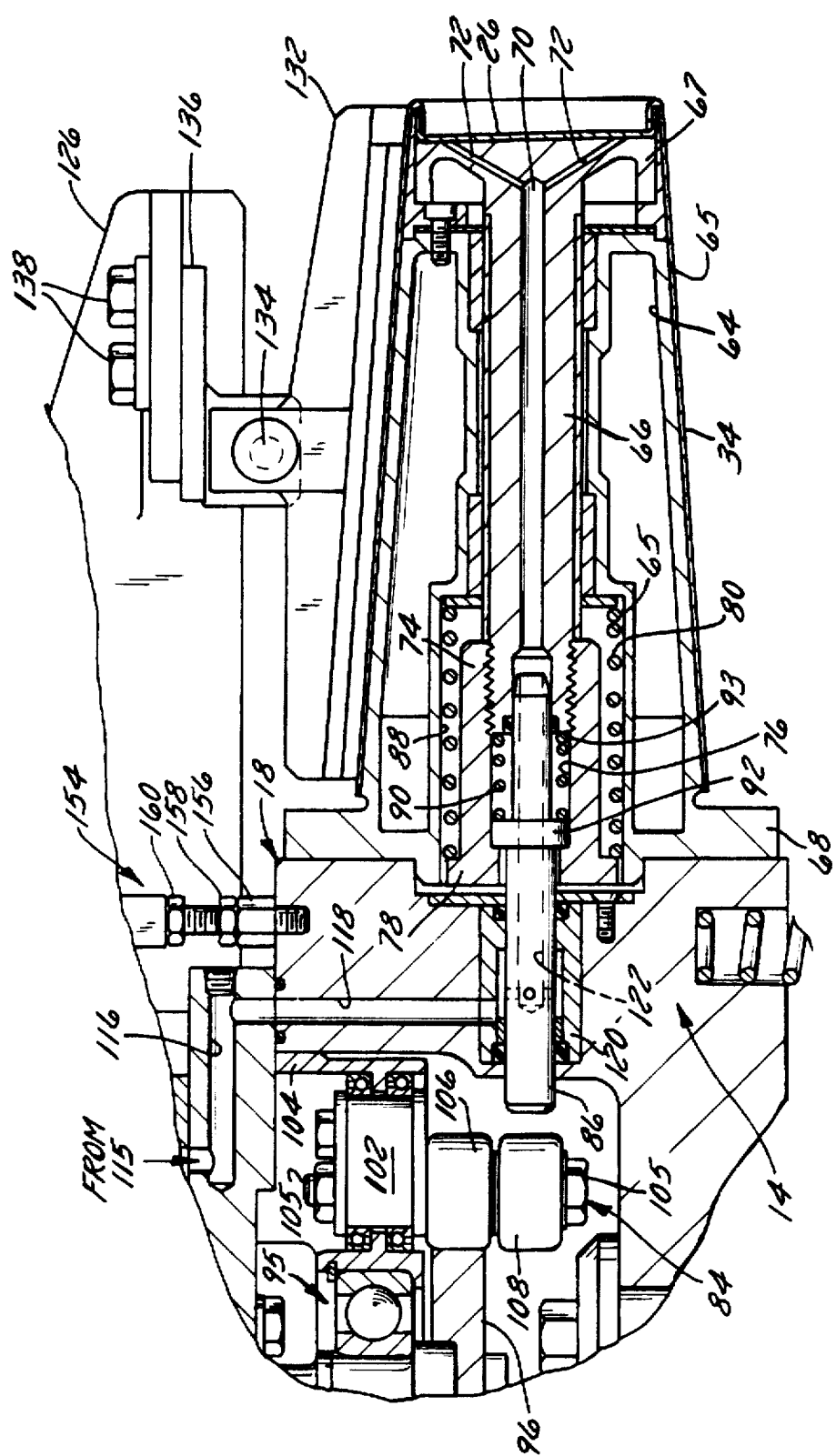
FIG. 3 is an enlarged view of the mandrel actuating assembly.
Figure 4:
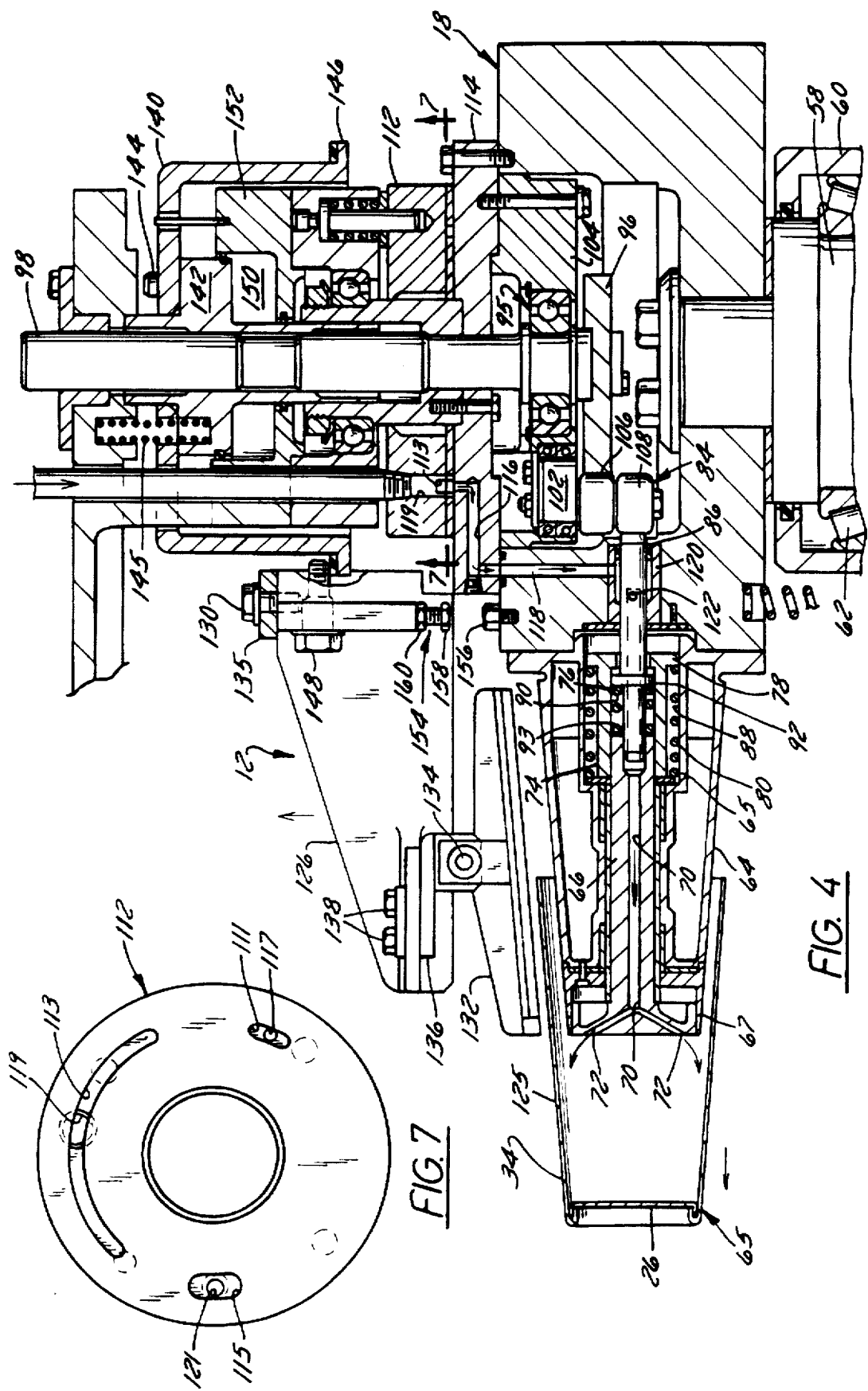
FIG. 4 is a view similar to FIG. 2 showing the open position of the seam clamp.

Referring more particularly to FIGS. 2, 3 and 4 a cross section of the turret 18 and one of the mandrels 24 is shown. The turret 18 is supported on a shaft 58 which is seated in a bearing housing 60 having a number of tapered roller bearings 62. Each mandrel 24 generally includes a hollow tapered housing 64 having a flange 68 and a tubular assembly 66 which is axially aligned in housing 64. The flange 68 being secured to the turret 18.

The tubular assembly 66 includes a flange 67 at one end which engages the outer end of the housing 64. An axial passage 70 is provided through the tubular member 66 which is connected to a number of angularly offset air passages 72 in the flange 67. The inner end of member 66 is supported by a housing 74 having an axial passage 76 and a radial flange 78 at the end thereof. The housing 74 is biased to a neutral position by means of a spring 80 positioned between flange 78 on housing 74 and a shoulder 65 on housing 64. The tubular member 66 is biased to a neutral position by the spring 80 which is seated on flange 78 on the end of housing 74 and a shoulder 65 on housing 64 (FIG. 3). The tubular member 66 is moved axially outwardly to release a cup 65 from the mandrel by means of a cam roller assembly 84 which is positioned to engage the end of a pin 86 mounted in passage 76 in housing 74. A flange 92 is provided on pin 86 in a position to engage a flange 78 at the end of passage 76. An overtravel spring 90 is provided in passage 76 in a position to engage the flange 92 on pin 86 and the end 93 of pin 66.

Figure 5:
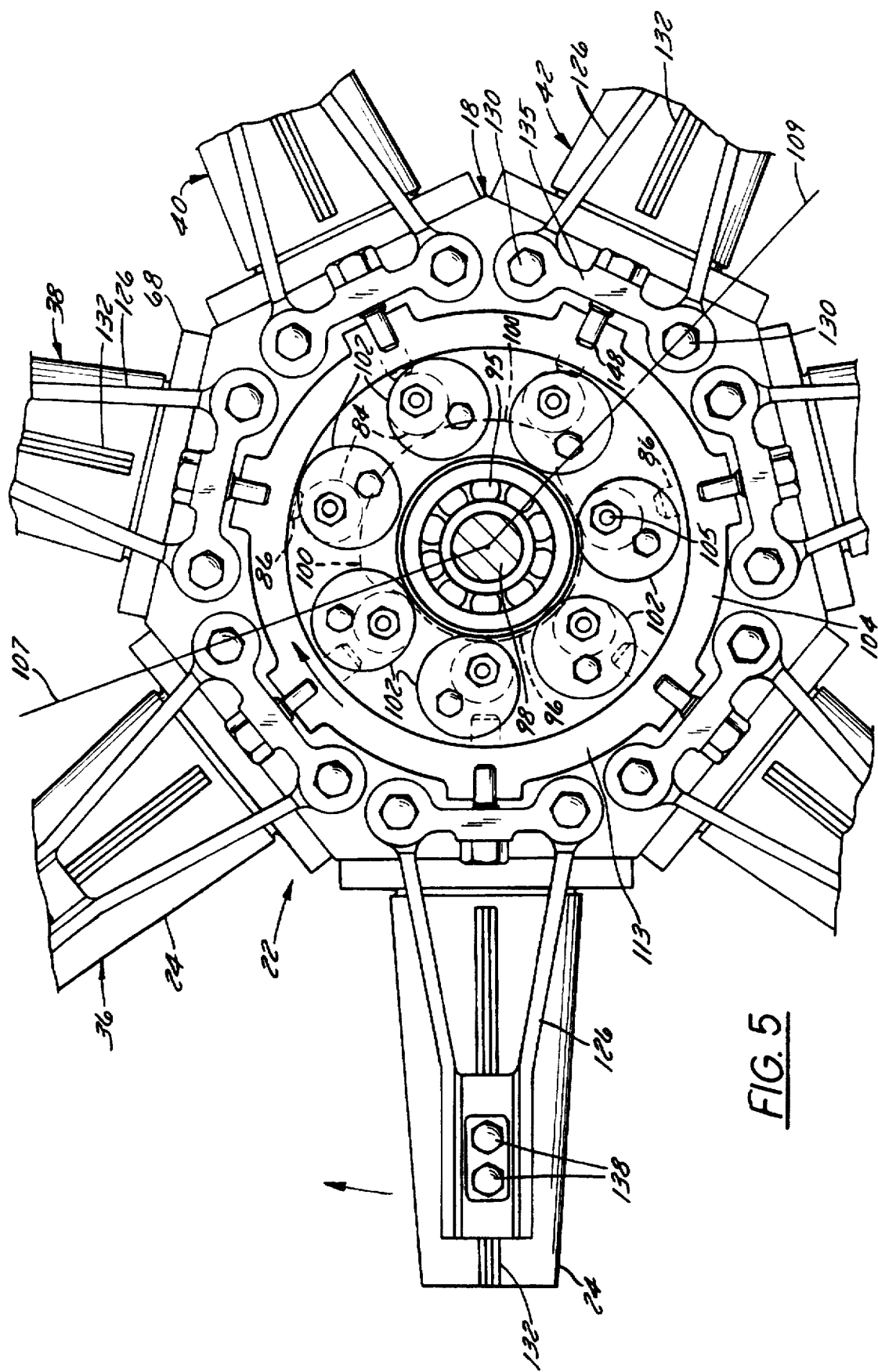
FIG. 5 is taken across line 5—5 of FIG. 2 showing a top view of the cam actuated cup ejector.

The tubular member 66 is extended to initially release the cup 65 from the mandrel by means of the offset cam roller assembly 84 which is actuated by a fixed cam plate 96 as shown in FIG. 5. In this regard the cam plate 96 is mounted on the lower end of the fixed cam shaft 98. The cam plate 96 includes a cam 100 on the outer periphery which bridges the in-curl station 38, bottom finish station 40 and cup discharge station 42. The cam roller assemblies 84 as shown in FIG. 3 generally include a plate 102 pivotally mounted in a mandrel mounting plate 104 which is supported on shaft 98 by a roller bearing 95. The cam roller assembly 84 includes a first cam roller 106 and a second cam roller 108 eccentrically mounted on plate 102 by means of a pin 105. The first cam roller 106 is positioned to engage the periphery of the cam plate 96 and the second cam roller 108 is positioned to engage the end of the pin 86.

In operation and referring to FIGS. 4 and 5 when the first cam roller 106 passes line 107 located between stations 36 and 38 and engages the cam 100 on cam plate 96, the cam plate 102 will pivot the second cam roller 108 into engagement with the end of the pin 86 pushing the tubular assembly 66 outwardly as shown in FIG. 4 to mechanically release the cup 65 from the mandrel housing 64. The pin 86 will remain extended through the in-curl station 38, the bottom finish station 40 and discharge or cup blow off station 42. When the roller 106 reaches the end of the cam 100 at line 109, the springs 80 and 90 will return the pin 86 and housing 66 to their original position and pivot the cam plate 102 back to its original position. When the mandrels 24 reach the blow off station 42 compressed air is admitted into the passages 70 and 72 to blow the cup off of the end of the mandrel into a receptacle 110 on the rimming turret 22.

In this regard a manifold plate 112 is mounted on the cam shaft 98. Air passages 111, 113 and 115 as shown in FIG. 7 are provided in the bottom of plate 112. Air openings 117, 119 and 121 are respectively connected to passages 111, 113 and 115. A pneumatic plate 114 is mounted on the turret 18 which pivots with the mandrels 24. An air passage 116 is provided in the pneumatic plate 114 and an air passage 118 is provided in mandrel mounting plate 18 which connect the manifold plate 112 to the bushing 120 which supports the pin 86. An air passage 122 is provided in pin 86 which is connected to the passages 70 and 72 in tubular assembly 66. When the mandrel rotates to the bottom blank work station 28, the air passages 70 and 72 are connected to the vacuum passage 113 in the diaphragm plate 112. In this regard it should be noted in FIG. 7 that the plate 112 includes a pressure passage 121, a vent passage 117 and a vacuum passage 119.

Seam Clamp Assembly

The seam clamp assembly 12 is positioned to engage and seal the seam 125 on the side wall of the cup. In this regard the side wall of the cup is wrapped around the mandrel 64 with the edges of the side wall overlapping on the top of the mandrel. The seam clamp assemblies 12 are held in the open or up position by air which on release allows the seam clamp assemblies to drop down on the seam.

Figure 6:
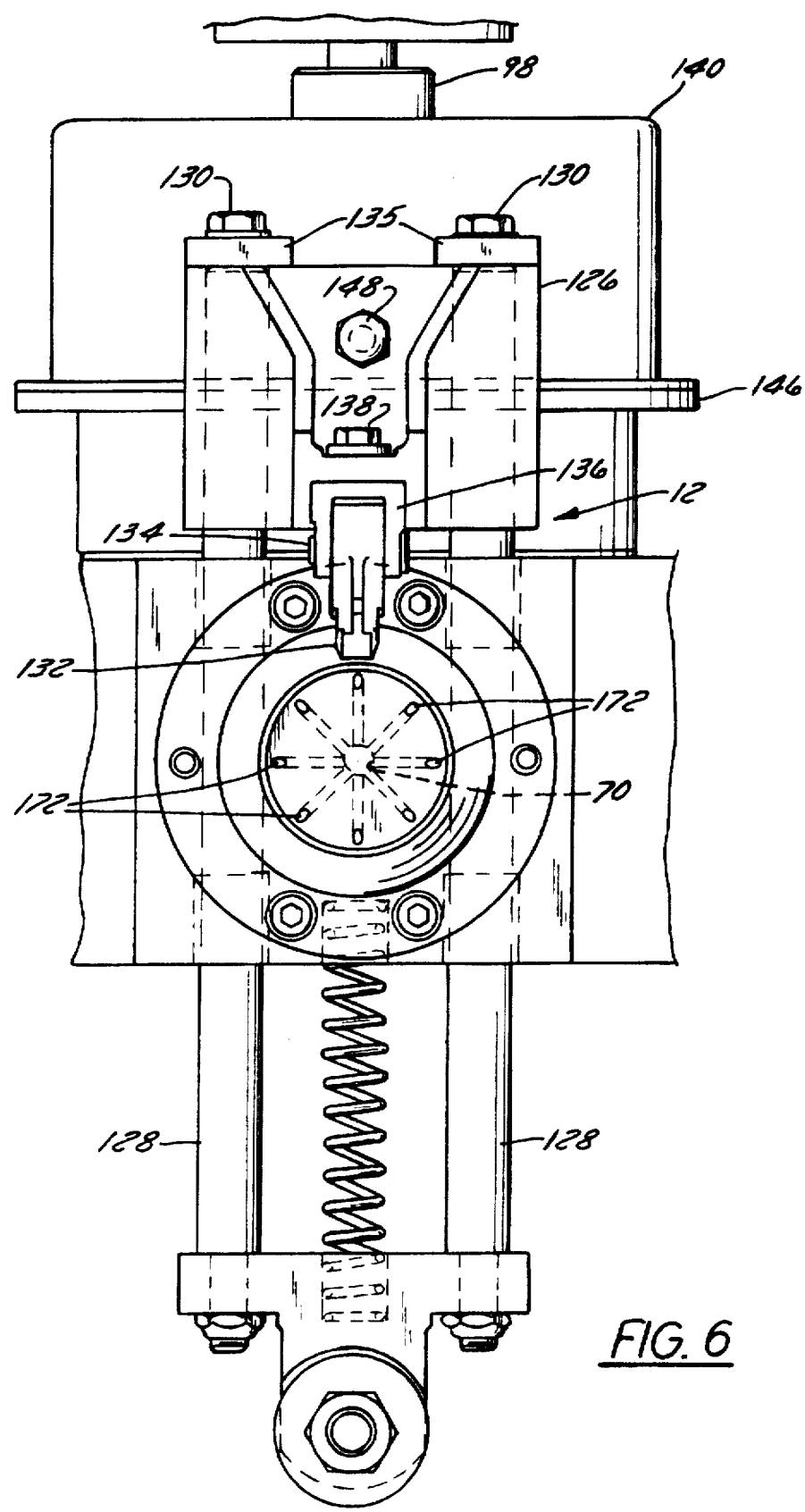
FIG. 6 is an end view showing one of the seam clamp assemblies.

Referring to FIGS. 4, 5 and 6 the seam clamp assembly 12 generally includes a seam clamp arm 126 which is mounted for reciprocal motion on seam clamp shafts 128 and secured thereto by bolts 130 and plates 135. A seam clamp 132 is pivotally mounted on the seam clamp arm 126 by means of a pin 134 mounted on a bracket 136 which is secured to the clamp arm 126 by bolts 138. The clamp arm 126 is free to pivot on pin 134 when moved into engagement with the tapered side wall of the housing 64.

The clamp arms 126 are simultaneously elevated, each time the mandrels 64 are indexed to the next stations. This is achieved by means of a cup shaped seam clamp lifter 140 which is secured to a piston 142 by bolts 144. The seam clamp lifter 140 includes a rim 146 around the outer perimeter of lifter 140 which is positioned to engage the end of a bolt 148 mounted on the end of the seam clamp arm 126. The lifter 140 is elevated by admitting air under pressure into a chamber 150 located between the piston 142 and the bearing housing 152. A number of springs 145 are provided around the lifter for biasing the piston 142 to the down position.

In operation each time the mandrel turret 18 is advanced to the next work station, the lifter 140 is elevated to lift the seam clamp assemblies 12 off of the mandrel turret 18. The lifter is elevated by pressurizing chamber 150 in bearing housing 152. The lip 146 engages the end of the bolt 148 to raise the seam clamp off of the seam in the side wall of the cup 65.

An adjustable limit stop assembly 154 is provided to control the amount of pressure on the mandrel. The limit stop assembly includes a first screw 156 seated on the top of the mandrel beneath each of the seam clamp arms. A second adjustable screw 158 is provided on each of the seam clamp arms 126 which is aligned with the screw 156. A lock nut 160 is provided on screw 158 to adjust the amount of pressure exerted by the seam clamp 132 on the ends of the side wall clamp. It should be noted that the seam clamp assemblies are dropped simultaneously with the movement of the mandrel to the blow off station.

Thus, it should be apparent that there has been provided in accordance with the present invention a cup making machine that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A machine for making paper cups, each cup including a side wall blank and a bottom wall blank, the machine including a frame and a vertical shaft mounted on the frame,
   a turret rotatably mounted on the shaft,
   a number of work stations mounted on the frame in an equally spaced relation around the turret,
   a number of tapered mandrels mounted on the turret in alignment with each of the work stations for forming a cup,
   means for intermittently rotating the turret to move the mandrels sequentially into alignment with each of the work stations, the improvement comprising a cam plate mounted on the shaft and a tubular assembly mounted in each of the tapered mandrels for initially releasing the cup from the mandrel, a pair of axially aligned cam followers pivotally mounted on the turret, one of the cam followers being positioned to engage the periphery of the cam plate and the other cam follower positioned to engage the inner end of the tubular assembly, means mounted on the turret for directing air through the tubular assembly to release the cup from the mandrel and a spring assembly in each of the tapered mandrels for biasing the tubular assembly to a retracted position in the tapered mandrel.

2. The machine according to claim 1 wherein said tubular assembly includes a number of air passages for directing air into the cup to blow the cup off of the mandrel.

3. The machine according to claim 1 including a seam clamp assembly mounted on the turret in alignment with each of the mandrels and means for simultaneously elevating the seam clamp assemblies when the mandrels are stepped to the next station.

4. The machine according to claim 3 wherein said means for elevating said seam clamp assemblies comprises a bearing housing mounted on the cam shaft, the bearing housing including a chamber, a piston mounted on the cam shaft for axial movement in the chamber, and a bell shaped lifter mounted on the piston for simultaneously elevating the clamp assemblies.

5. The machine according to claim 4 wherein each clamp assembly includes an arm and a clamp pivotally mounted on the arm for matingly engaging the overlapping edges of the cup.

6. The machine according to claim 4 wherein said elevating means includes a lip around the periphery of the lifter for engaging each of the arms to elevate the clamps when the mandrels are indexed to the next station.

7. A cup making machine comprising:

a frame, a shaft mounted on the frame, a cam plate mounted on the shaft, a cam surface provided on the outer periphery of the cam plate, a turret pivotally mounted on the shaft, a number of mandrels mounted on the turret at equally spaced intervals, means for forming a cup on the mandrels, each mandrel including a tubular assembly mounted for axial movement in each mandrel to initially release each cup from the mandrel, a roller assembly pivotally mounted on the turret in alignment with each of the mandrels, each roller assembly including a first roller positioned to engage the cam plate and a second roller positioned to engage the tubular assembly, whereby said first roller will pivot on engagement with the cam plate and said second roller will rotate into engagement with the tubular assembly to release the cup from the mandrel.

8. The cup making machine according to claim 7 including means for ejecting the cup from the mandrel.

9. The cup making machine according to claim 8 wherein said ejecting means includes an air passage in said tubular member and means mounted on said shaft for admitting air under pressure into said air passage to eject the cup from the mandrel.

10. The cup making machine according to claim 9 including a seam clamp assembly mounted on the turret in alignment with each of the mandrels and means for elevating the seam clamp assemblies simultaneously with the admission of air into said air passage.

* * * * *